Dec. 13, 1955   R. H. GODDARD   2,726,510
FLIGHT-CONTROL APPARATUS INVOLVING STEERING COMBUSTION CHAMBERS
Filed March 26, 1952
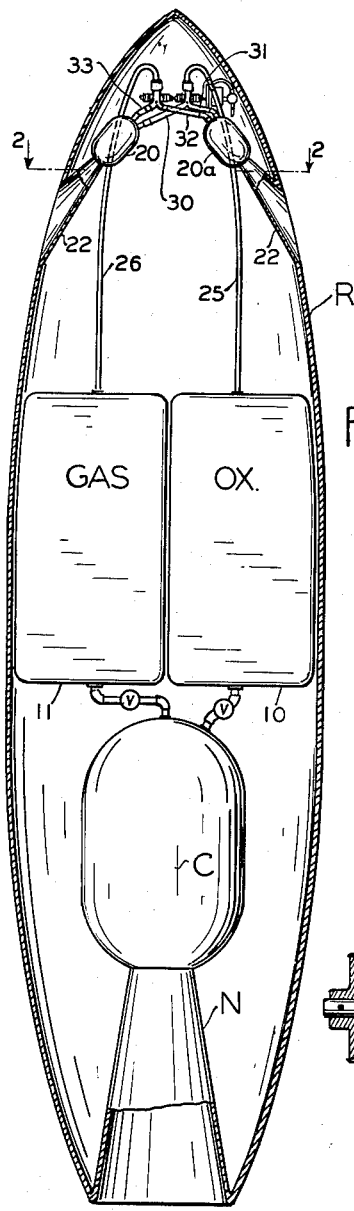
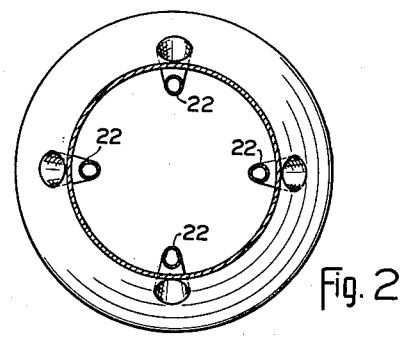
Fig. 2
Fig. 1
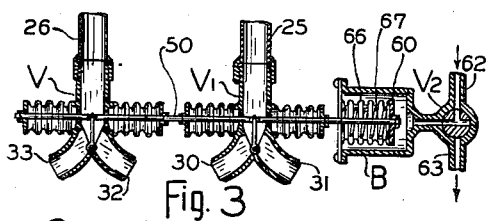
Fig. 3
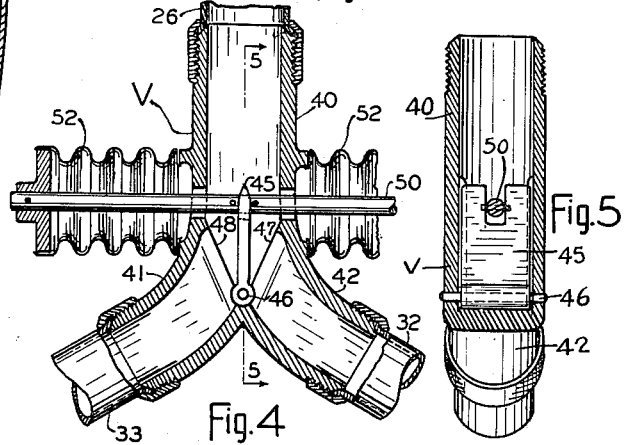
Fig. 4
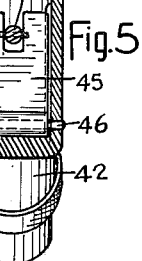
Fig. 5
INVENTOR.
ROBERT H. GODDARD, DEC'D.
ESTHER C. GODDARD, EXECUTRIX.
BY
Chas. T. Hawley
ATT'Y.

United States Patent Office 2,726,510
Patented Dec. 13, 1955

2,726,510

FLIGHT-CONTROL APPARATUS INVOLVING STEERING COMBUSTION CHAMBERS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application March 26, 1952, Serial No. 278,711

1 Claim. (Cl. 60—35.54)

This invention relates to rocket apparatus and to other jet-propelled aircraft, and relates more particularly to the control and direction of the flight thereof.

It is the general object of the invention to provide steering means comprising a plurality of angularly-spaced auxiliary combustion chambers, located at the front end of the craft and selectively operative in diametrically opposed pairs to direct the flight in a desired direction.

An important feature of the invention relates to the provision of improved means for coactive operation of a pair of combustion chambers positioned diametrically opposite to each other.

The invention further relates to arrangements and combinations of parts which will be hereinafter described and more particularly pointed out in the appended claim.

A preferred form of the invention is shown in the drawing, in which

Fig. 1 is a sectional plan view of an aircraft embodying this invention;

Fig. 2 is a sectional end view, taken along the line 2—2 in Fig. 1;

Fig. 3 is a plan view of a special valve construction;

Fig. 4 is an enlarged plan view of certain parts shown in Fig. 3; and

Fig 5 is a sectional elevation, taken along the line 5—5 in Fig. 4.

Referring to the drawing, an aircraft R is shown as provided with a combustion chamber C having a rearward discharge nozzle N, and as having supply tanks 10 and 11 under pressure and constituting storage for a liquid oxidizer, as oxygen, and for a liquid fuel, as gasoline. The tanks 10 and 11 are suitably connected to the combustion chamber C and the parts thus far described may be of any usual construction.

For steering purposes, a plurality of auxiliary combustion chambers, as 20 and 20a, are provided in the front end of the aircraft. These auxiliary combustion chambers are preferably four in number and are spaced at 90° apart. Each combustion chamber is provided with a nozzle 22 discharging obliquely rearward through an associated port in the aircraft casing.

In Fig. 1, a pair of auxiliary combustion chambers 20 and 20a are shown, which may be used for controlling the direction of flight in a horizontal plane. Each combustion chamber 20 and 20a receives liquid oxygen from the tank 10 through a pipe 25, and receives liquid fuel from the tank 11 through a pipe 26.

Each of the pipes 25 and 26 is connected to both of the combustion chambers 20 and 20a, as clearly shown in Fig. 1. The oxygen pipe 25 is connected by branch pipes 30 and 31 to both combustion chambers 20 and 20a respectively, and the fuel supply pipe 26 is similarly connected by pipes 32 and 33 to said combustion chambers.

Special valves V and V' connect the supply pipes 25 and 26 to the branch connections above described, and the details of construction of these valves is clearly shown in Figs. 3 to 5.

Considering the valve V shown particularly in Figs. 4 and 5, the valve V comprises a casing having an inlet portion 40 connected to the supply pipe 26 and having branch outlet portions 41 and 42 connected to the combustion chambers 20 and 20a by the pipes 32 and 33 previously described.

A swinging valve plate or clapper 45 is pivoted at 46 in the valve V and may be swung to the right or to the left to engage valve seats 47 and 48. The valve plate 45 has an operative connection to a valve rod 50, extending through the valve casing and provided with bellows packing 52 at each side of the casing to prevent leakage.

When the valve rod 50 is moved to the right in Fig. 4, the valve port opening for the branch outlet portion 42 will be reduced and the corresponding opening for the branch outlet portion 41 will be increased. If the rod 50 is moved in the opposite direction, reverse procedure will occur.

The rod 50 extends continuously through both valves V and V' (Fig. 3), and at its right-hand end is connected to a disc 60 in a bellows operator B. The bellows operator B is connected through a three-way valve V2 to an inlet pipe 62 and to an exhaust pipe 63. The pipe 62 is commonly connected to receive liquid under pressure from the oxygen supply pipe 25.

When liquid pressure is thus applied, the bellows 66 in the bellows operator B is compressed against the action of the spring 67, and the valve rod 50 is moved to the left, thus decreasing the supply of both combustion liquids to the auxiliary chamber 20 and correspondingly increasing the supply of both combustion liquids to the auxiliary combustion chamber 20a.

If the three-way valve V2 is reversed, the bellows operator will be connected to exhaust, and the spring 67 will move the valve rod 50 to the right, thus increasing the combustion liquid supply for the chamber 20a and decreasing the combustion liquid supply for the chamber 20.

The relative force of the discharge blasts from the two opposite chambers 20 and 20a may thus be varied to produce any desired turning effect on the aircraft in a horizontal plane. If the valve V2 is placed in an intermediate position in which the supply pipe 62 and the exhaust pipe 63 are both closed, the bellows operator B will hold the rod 50 in any desired fixed position and with the plates or clappers 45 maintaining any desired proportional flow to the diametrically opposed combustion chambers.

It will be understood that the connections and control apparatus above described are duplicated in the vertical plane to control the operation of two additional auxiliary combustion chambers which control elevation or depression of the direction of flight.

All four of the auxiliary chambers are in continuous operation during flight and contribute some additional propulsive force for the aircraft. The steering is effected entirely by varying the relative thrust at opposite sides of the craft or above and below the craft.

Having thus described the invention and the advantages thereof, it will be understood that the invention is not to be limited to the details herein disclosed, otherwise than as set forth in the claim, but what is claimed is:

Flight-control apparatus for rocket craft having an enclosing casing, which apparatus comprises a pair of steering combustion chambers and discharge nozzles positioned at the front of said casing and discharging outwardly and rearwardly thereof, said pair of combustion chambers being disposed in diametrically opposite positions in said craft, separate means to supply two liquid combustion agents to both of said combustion chambers, a single valve for each liquid supply means which determines the relative flow of said liquid to said chambers, and a reciprocating rod connected to said valves for simultaneously shifting the valves and oppositely to vary the relative flow of both liquids to said chambers and the relative thrust of said chambers.

References Cited in the file of this patent

UNITED STATES PATENTS

| Number | Name | Date |
|---|---|---|
| 426,300 | Morton | Apr. 22, 1890 |
| 1,690,043 | Wallis | Oct. 30, 1928 |
| 2,450,950 | Goddard | Oct. 12, 1948 |
| 2,499,401 | Madden | Mar. 7, 1950 |
| 2,529,508 | MacDonald | Nov. 14, 1950 |
| 2,531,761 | Zucrow | Nov. 28, 1950 |
| 2,613,497 | MacDonald | Oct. 14, 1952 |